United States Patent [19]

Toki

[11] Patent Number: 4,761,806
[45] Date of Patent: Aug. 2, 1988

[54] METHOD AND CIRCUIT FOR SETTING DIALING DATA IN A WIRELESS TELEPHONE

[75] Inventor: Akio Toki, Hino, Japan

[73] Assignee: Kabushiki Kaisha Toshiba, Kawasaki, Japan

[21] Appl. No.: 75,891

[22] Filed: Jul. 21, 1987

[30] Foreign Application Priority Data

Mar. 23, 1987 [JP] Japan ................................ 62-65558

[51] Int. Cl.$^4$ ............................................. H04Q 7/04
[52] U.S. Cl. ........................................ 379/61; 379/62
[58] Field of Search ................. 379/61, 62, 63; 455/54

[56] References Cited

U.S. PATENT DOCUMENTS

| | | | |
|---|---|---|---|
| 4,119,800 | 10/1978 | Girardi | 379/62 |
| 4,436,957 | 3/1984 | Mazza et al. | 379/62 |
| 4,481,382 | 11/1984 | Villa-Real | 379/61 |
| 4,500,752 | 2/1985 | Lee | 379/61 |
| 4,508,935 | 4/1985 | Mastromoro | 379/62 |
| 4,591,661 | 5/1986 | Benedetto et al. | 379/61 |
| 4,640,987 | 2/1987 | Tsukada et al. | 379/62 |
| 4,650,931 | 3/1987 | Tsukada et al. | 379/61 |
| 4,677,655 | 6/1987 | Hashimoto | 379/61 |
| 4,691,338 | 9/1987 | Makino | 379/61 |

Primary Examiner—Robert Lev
Attorney, Agent, or Firm—Banner, Birch, McKie & Beckett

[57] ABSTRACT

An information storing apparatus is provided in a radio telephone apparatus having a base unit coupled to a wired telephone line and a radio telephone set. The base unit includes a memory for storing telephone number information and line relay for making or breaking a speech path between the base unit and the wired telephone line. When a registration signal is transmitted from the radio telephone set, the base unit is disconnected from the wired telephone line to break the speech path. Thereafter, if a dial signal from the radio telephone set is received, the received dial signal is stored in the memory as the telephone number information used for a reduced dialog operation. If a calling signal arrives at the wired telephone line while the dial signal is being stored, the calling signal is detected by another telephone apparatus coupled to the wired telephone line. Therefore, the telephone apparatus generates a ringing signal in response to the detected signal.

17 Claims, 9 Drawing Sheets

METHOD AND CIRCUIT FOR SETTING DIALING DATA IN A WIRELESS TELEPHONE

BACKGROUND OF THE INVENTION

1. Field of the Invention

This invention relates to the field of radio telephones, typically cordless telephones and, more particularly, to method and apparatus for storing a dial signal as telephone number information.

2. Description of the Prior Art

As is well known in the art, radio telephones are comprised of a radio telephone set having a handset and a base unit connected to wired telephone lines for exchanging speech signals between the wired telephone lines and the radio telephone set through a radio channel. The base unit and the radio telephone set are respectively provided with a pair of corresponding transmitters and receivers.

When a call signal arrives at a wired telephone line, the base unit transmits a paging signal to the radio telephone set through a predetermined control channel to form a speech channel. The paging signal includes a channel signal indicating one of a plurality-of speech channels. Then, the radio telephone set starts an operation to send out a paging response signal through the control channel in response to the received paging signal. The base unit detects the intensity of the received paging response signal sent out from the radio telephone set, i.e., the intensity of the paging response signal at the control channel. Then, the base unit stops the transmission of the paging signal when the detected intensity exceeds a predetermined level and switches the radio channel between the base unit and the radio telephone set from the control channel to the speech channel indicated in the paging signal. The radio telephone set also switches the radio channel from the control channel to a speech channel by the received paging signal. Thereafter, the base unit transmits a bell ringing signal to the radio telephone set via the speech channel. After transmitting a bell ringing signal, the base unit establishes a speech path between the wired telephone line and the radio telephone set when it receives an "off-hook" signal from the radio telephone set.

When the base unit receives a call origination signal (an "off-hook" signal) from the radio telephone set through the control channel while it is in a waiting state, it determines the request from the radio telephone set to originate a call and transmits a response signal which includes a channel signal indicating one of the plurality of speech channels. Then, the base unit establishes a speech path between the wired telephone line and itself, and switches the radio channel from the control channel to the speech channel indicated in the response signal. After receiving the response signal, the radio telephone set also switches the radio channel from the control channel to the speech channel in response to the received response signal. If the radio telephone set transmits a dial signal to the base unit through the speech channel, the dial signal is transmitted to the wired telephone line via the base unit.

Thus, the radio telephone apparatus is capable of receiving incoming telephone calls from the wired telephone lines and originating calls from the radio telephone set.

In the above described radio telephones, the telephone set is powered by a small storage battery to enable the telephone set to be carried easily. As a result, a RAM, which is used to store a plurality of telephone numbers to thereby reduce dialing operations, cannot be provided in the radio telephone set because the lifetime of the battery decreases if the voltage from the battery is continuously supplied to the RAM to store the telephone number information. The RAM is provided in the base unit because the base unit is powered by a D.C. power source converted from an AC power source.

In the prior art radio telephones, the storing of telephone number information is carried out as follows. First, a user picks up the handset of the radio telephone set to depress a registration key and a dial key (FIGS. 1 and 2). When the handset is picked up, the radio telephone set determines an "off-hook" condition and transmits a call origination signal to the base unit. Thereafter, the operation of call origination is carried out as described above. When the registration key is depressed after the speech channel between the base unit and the radio telephone set is established, a corresponding key signal is transmitted to the base unit. The base unit then waits for the dial signal transmitted by the radio telephone set in response to the received key signal. When the dial key is depressed after depressing the registration key, the dial signal corresponding to the depressed dial key is transmitted to the base unit and stored in the memory in the base unit. When the handset is placed down in its initial position after the dial key is depressed, an end signal is transmitted to the base unit. Therefore, the end operation is carried out and the radio telephone apparatus is returned to its waiting state again.

However, in prior art radio telephones, the telephone is in a busy state while the dial signal is stored in the memory as telephone number information because the base unit is connected to the wired telephone line electrically until the base unit receives the end signal in response to the handset being set down in its initial position i.e., hung up or placed "on the hook." As a result, an incoming telephone call from the wired telephone line cannot be received while the dial signal is being stored as telephone number information, therefore, the radio telephone apparatus cannot respond to an incoming telephone call.

The problem can cause significant inconvenience in a system capable of storing a large number of telephone numbers. For example, if 100 numbers are to be stored, the telephone apparatus will be in its busy state for a long time and many telephone calls will be missed.

SUMMARY OF THE INVENTION

It is, therefore, an object of the present invention to provide a method and apparatus for storing telephone number information, wherein during the storing procedure the telephone is capable of responding an incoming telephone call.

It is further an object of the present invention to provide a method and apparatus for storing telephone number information and confirming the storing operation.

According to this invention, and in order to realize the above noted objects, an information storing apparatus, for storing telephone number information, is provided in a radio telephone apparatus. The radio telephone apparatus comprises a base unit coupled to a wired telephone line and a radio telephone set connected to the base unit through a radio channel. The base unit is powered by a DC power source converted from a commercial AC power supply and the radio telephone set is powered by a DC power source from a small storage battery. The radio telephone set includes dial keys and a registration key. When the handset of the radio telephone set is picked up, a call origination signal is transmitted to the base unit. The line relay of the base unit connects the wired telephone line to the base unit electrically to make a speech path, in response to the received call origination signal. A registration signal is transmitted to the base unit when the registration key is depressed after this connection. The line relay disconnects the wired telephone line to the base unit electrically to break the speech path, in response to the received registration signal. Thereafter, if a dial key is depressed, a dial signal is transmitted to the base unit and is stored in a memory in the base unit as telephone number information. The stored dial signal is adapted to be subsequently dialed by a simplified dialing operation, such as depressions of the '#' key (a sharp key),'1' key and/or '0' key. A notification circuit connected to the wired telephone line, detects an incoming telephone call and produces a ringing signal to notify a user of an incoming telephone call. Therefore, the incoming telephone call can be received from the wired telephone line and the user will be notified of the incoming telephone call by the ringing signal.

BRIEF DESCRIPTION OF THE DRAWINGS

The subject matter which is regarded as the invention is particularly pointed out and distinctly claimed in the claims of the specification. The invention, however, both as to organization and method of practice, together with further objects and advantages thereof, may be best understood by reference to the following detailed description of the invention taken in conjunction with the drawings in which:

DETAILED DESCRIPTION

Figure 1:
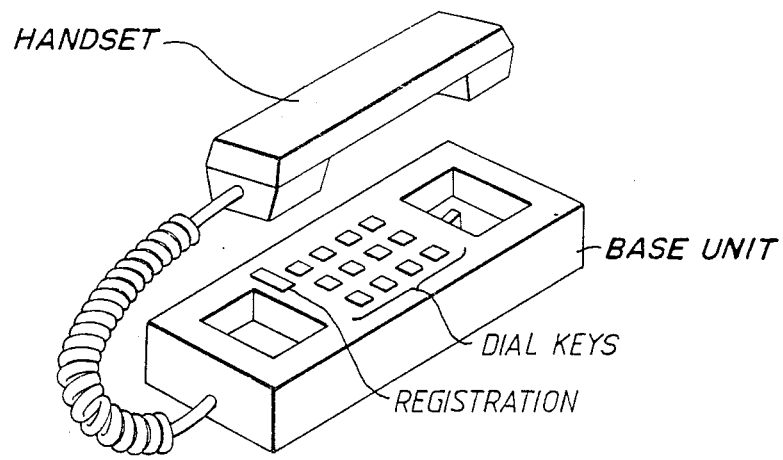
FIGS. 1 and 2 are external views of two kinds of radio telephone sets.
Figure 2:
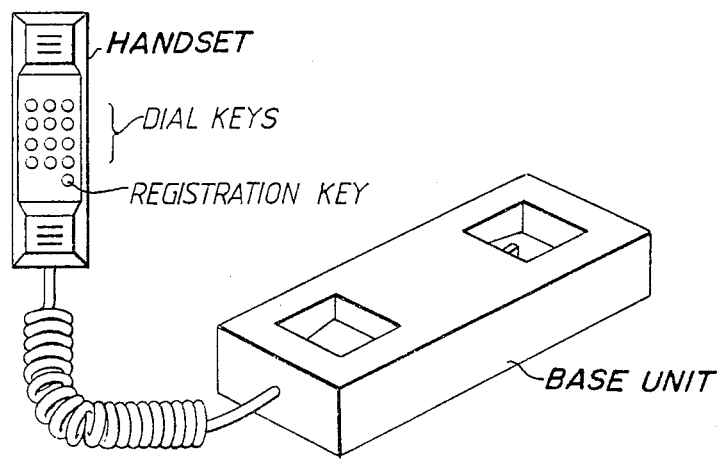
Figure 3:
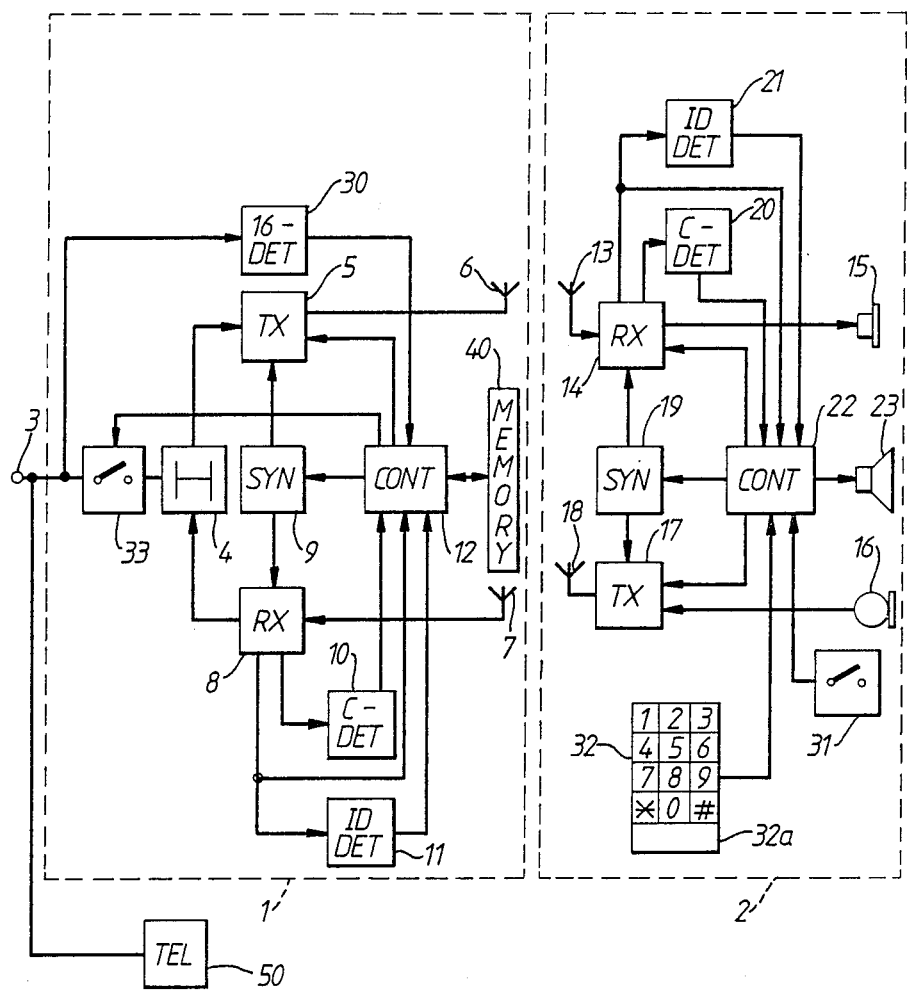
FIG. 3 shows a first embodiment of the present invention in block diagram form.

In the embodiment shown in FIG. 3, base unit 1 is coupled to a radio telephone set 2 through one of a plurality of radio channels including a control channel (C-CH) and a plurality of speech channels (S-CHs), and is also connected to a wired telephone line 3. Base unit 1 includes AC/DC converter and AC plug (not shown) in order to produce DC voltage from a commercial power source (AC power source). The DC voltage is supplied to electrical components of base unit 1. Thus, base unit 1 is operated by the converted DC voltage. On the other hand, radio telephone set 2 includes a small storage battery to supply DC voltage to its electrical components.

A signal sent from wired telephone line 3 is applied to hybrid circuit 4 via line relay 33 when line relay 33 is closed (ON-state) to make a speech path between wired telephone line 3 and base unit 1. Hybrid circuit 4 supplies the signal to transmitter 5. Transmitter 5 modulates a carrier wave according to the supplied signal and transmits the modulated signal to radio telephone set 2 via transmitting antenna 6. The carrier wave is supplied from synthesizer 9 and has a frequency corresponding to a radio channel selected, in a known manner, by synthesizer 9.

A signal transmitted from radio telephone set 2 is received by receiving antenna 7 and demodulated by receiver 8 according to the carrier wave supplied from synthesizer 9. The demodulated signal is sent to wired telephone line 3 via hybrid circuit 4 and line relay 33 when line relay 33 is closed. The demodulated signal is also supplied to received field detector 10 and identification signal detector 11. Detector 10 comprises a carrier squelch circuit or noise squelch circuit, and detects the intensity of the received field in a known manner, while detector 11 determines whether the identification signal contained in the demodulated signal corresponds to a specific identification signal allocated to radio telephone set 2 in a known manner. The detected signals from detectors 10 and 11 are supplied to control circuit 12. The demodulated signal from receiver 8 is also supplied to control circuit 12 to decode a control signal contained in the demodulated signal to establish a speech path.

The call signal detector 30 detects a call signal (16 Hz signal) sent from wired telephone line 3, and informs control circuit 12 of the fact that the call signal has been received. Therefore, control circuit 12 determines that an incoming telephone call from wired telephone line 3 is detected.

Control circuit 12 includes a microcomputer, a RAM for storing operation data and ROM containing a stored operation program, and controls transmitter 5, synthesizer 9 and line relay 33 to establish a speech path in response to the output signals of receiver 8, detectors 10, 11 and 30. Control circuit 12 also includes a dial circuit (not shown) to produce a dial signal such as DTMF (dual tone multi-frequency), signal or DP (dial pulse) signal. The produced dial signal is sent to wired telephone line 3 via line relay 33.

Memory 40 comprises a RAM and stores a plurality of telephone number information and a data table representing a relationship between reduced telephone numbers and address data. Memory 40 is controlled by control circuit 12.

In radio telephone set 2, a signal transmitted from base unit 1 is received by receiving antenna 13, demodulated by receiver 14 and then applied to speaker 15. In the same manner as in base unit 1, the signal demodulated by receiver 14 is supplied to received signal detector 20, identification signal detector 21 and control circuit 22. A voice signal inputted into microphone 16 is supplied to transmitter 17 as a modulation input and then transmitted to base unit 1 through transmitting antenna 18.

Control circuit 22 includes a microcomputer, a RAM for storing data and a ROM containing a stored operation program, and controls receiver 14, transmitter 17 and synthesizer 19 to establish a speech path in response to the output signals of receiver 14, and detectors 20 and 21. Control circuit 22 also causes speaker 23 to produce a ringing signal when it determines a bell ringing signal is received according to the demodulated signal from receiver 14. Speakers 15, 23 and microphone 16 are adapted to consume very little electricity. Speaker 15 and microphone 16 are arranged in the handset. Control circuit 22 further controls the operations of call origination and data registration in response to data from hook switch 31, dial keys 32 and registration key 32a. Dial keys 32 and registration key 32a are arranged so as to be able to be depressed when the hand set of radio telephone set 2 is picked up.

Another telephone apparatus 50, such as a conventional telephone apparatus, is directly connected to wired telephone line 3 so that it is able to respond to the incoming telephone call from wired telephone line 3.

The operation of this embodiment is described with reference to the flow chart shown in FIG. 4 as follows.

In a waiting state, control circuit 12 causes transmitter 5 to turn off and control circuit 22 aiso causes transmitter 17 to turn off, in order to prevent an unnecessary transmission of radio wave. Control circuit 22 further causes receiver 14 to turn off and on periodically to minimize the consumption of electricity by the receiver when it is in the waiting state. Aiso, in the waiting state, line relay 33 is opened (OFF-state) by control circuit 12.

When the hand set of radio telephone set 2 is picked up by the user, an OFF-hook signal is supplied to control circuit 22 because hook switch 31 is closed (ON-state). Control circuit 22 determines a call origination signal in response to the OFF-hook signal, step 201, and causes transmitter 17 to turn on, step 202. Control circuit 22 then sends a call origination signal to transmitter 17 to modulate and transmit the signal, step 203. ln this state, synthesizer 19 supplies a carrier wave, corresponding to a control channel, to transmitter 17. After transmitting the call origination signal, control circuit 22 causes receiver 14 to turn on and remain in the "ON-state."

The transmitted call origination signal is received and demodulated by receiver 8. The demodulated signal is supplied to control circuit 12. To determine if the demodulated signal is a call origination signal, step 101, control circuit 12 causes transmitter 5 to turn on, step 102. Control circuit 12 then sequentially switches the receiving channel to one of the speech channels in sequence to find a vacant speech channel. If control circuit 12 finds a vacant speech channel, it sends a response signal to transmitter 5 to modulate and transmit the signal, step 103. The response signal includes speech channel signal indicating the vacant speech channel and a predetermined identification signal. Control circuit 12 then sends control signais to line relay 33 and synthesizer 9 to connect wired telephone line 3 to hybrid circuit 4 and switch the control channel to the selected vacant speech channel, steps 104 and 105.

When receiver 14 receives the transmitted response signal, receiver 14 demodulates the signal and sends the demodulated signal to control circuit 22. When control circuit 22 determines the demodulated signal corresponds to the response signal, step 204, it sends a control signal to synthesizer 9 to switch the control channel to the indicated speech channel according to the speech channel signal portion of the response signal, step 205. In this determination, control circuit 22 compares the identification signal portion of the response signal to predetermined identification data stored therein. If control circuit 22 determines the identification signal doesn't correspond to the predetermined identification data, it doesn't respond to the demodulated signal. lf the corresponding response signal is not received for a predetermined period, step 214, control circuit 22 annuls the received origination request and causes transmitter 17 to turn off, step 213. Control circuit 22 also causes receiver 14 to turn off and on periodically. Therefore, radio telephone set 2 is placed in the waiting state again.

When the speech channel between base unit 1 and radio telephone set 2 is established, a dial tone from wired telephone line 3 is transmitted to radio telephone set 2 and is generated by speaker 15. If a dial key 32 is depressed after a dial tone is heard from speaker 15, key data, corresponding to the depression of dial key 32, is supplied to control circuit 22. Control circuit 22 determines if a dial key 32 is depressed in response to the received key data and provides the data to transmitter 17, steps 208 and 209. Transmitter 17 modulates the data and transmits the modulated signal as a dial signal through the speech channel. However, if the registration key 32a is depressed after a dial tone is heard, key data, corresponding to key 32a, is supplied to control circuit 22. Control circuit 22 determines registration key 32a is depressed in response to the received key data and provides the data to transmitter 17, steps 206 and 207. Transmitter 17 modulates the data and transmits the modulated signal as a registration signal through the speech channel.

When control circuit 12 receives the dial signal after switching to the speech channel, step 110, it stores the received dial signal in its buffer and looks at a state of a registration flag in its buffer, step 111. Since the registration flag is in the OFF-state ('0' data) until the registration signal is received, control circuit 12 determines a speech mode in response to the state of the registration flag, step 111. Control circuit 12 then sends a dial signal, such as a DTMF (dual tone multi-frequency) signal or a DP (dial pulse) signal, to wired telephone line 3 through line relay 33, in response to the stored dial signal, step 112. Thus, the operation of call origination is completed and the radio telephone apparatus is in a speech state.

Thereafter, when the handset of radio telephone set 2 is put down, control circuit 22 determines the end of speech in response to the ON-hook signal from hook switch 31, step 210. Control circuit 22 then sends an end signal to transmitter 17 to transmit the signal to base unit 1, step 211, and sends a control signal to synthesizer 19 to switch the speech channel to the control channel, step 212. Control circuit 22 further causes transmitter 17 to turn off, step 213, and receiver 14 to turn off and on periodically. Therefore, radio telephone set 2 is in the waiting state again. When the end signal is received by receiver 8, receiver 8 demodulates the end signal and sends the signal to control circuit 12. Control circuit 12 sends a control signal to synthesizer 9 to switch the speech channel to the control channel in response to the end signal, steps 114 and 116. Control circuit 12 aiso sends control signals to line relay 33 and transmitter 5 to disconnect wired telephone line 3 from hybrid circuit 4 and turn off transmitter 5, steps 117 and 118. Therefore, base unit 1 is in the waiting state again.

If a registration signal is transmitted to base unit 1 in step 207, the signal is received by receiver 8. Control circuit 12 sends a control signal to line relay 33 to disconnect wired telephone line 3 from hybrid circuit 4 in response to the registration signal from receiver 8, steps 106 and 108. Control circuit 12 also causes the registration flag to be in the ON-state ('1' data), step 109, determines a registration mode of telephone number information is established. Thereafter, since the registration flag is in the ON-state, control circuit 12 stores the received dial signal in memory 40 as telephone number information when receiving the dial signal from radio telephone set 2, steps 110, 111 and 113. Since the user put down the handset after depressing dial key 32 to register the telephone number, ON-hook signal is supplied to control circuit 22. Control circuit 22 carries out the end of speech operation in response to the ON-hook signal, steps 210-213, as described above. When control circuit 12 receives the end signal after storing the data signal in memory 40, step 115, it sends the control signal to synthesizer 9 to switch the speech channel to the control channel, step 120. Control circuit 12 also causes transmitter 5 to turn off and the registration flag to be in the OFF-state, steps 18 and 119.

Figure 4A:
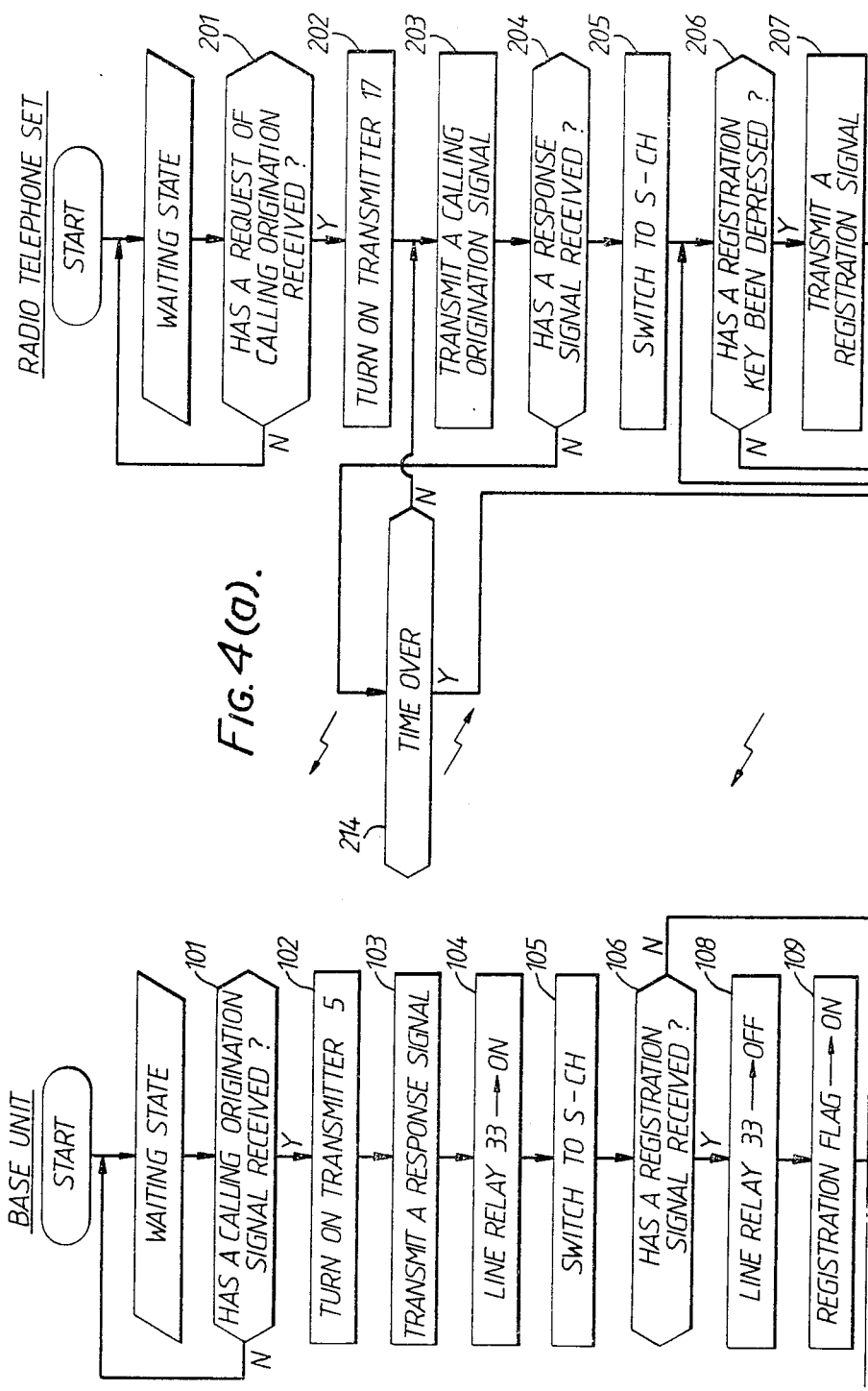
FIGS. 4-6 show flow charts of a radio telephone apparatus of FIG. 3.
Figure 4:
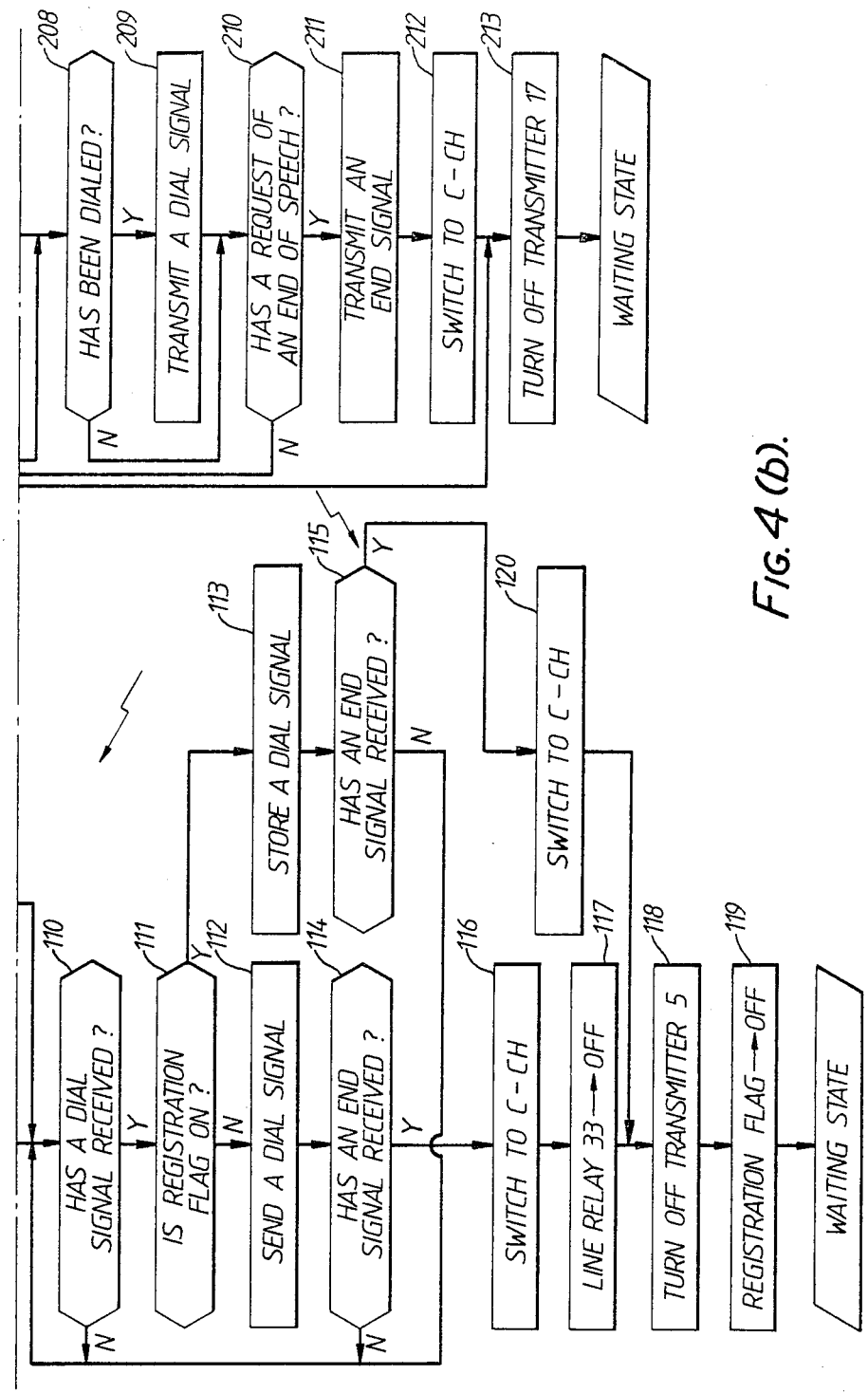
Figure 5:
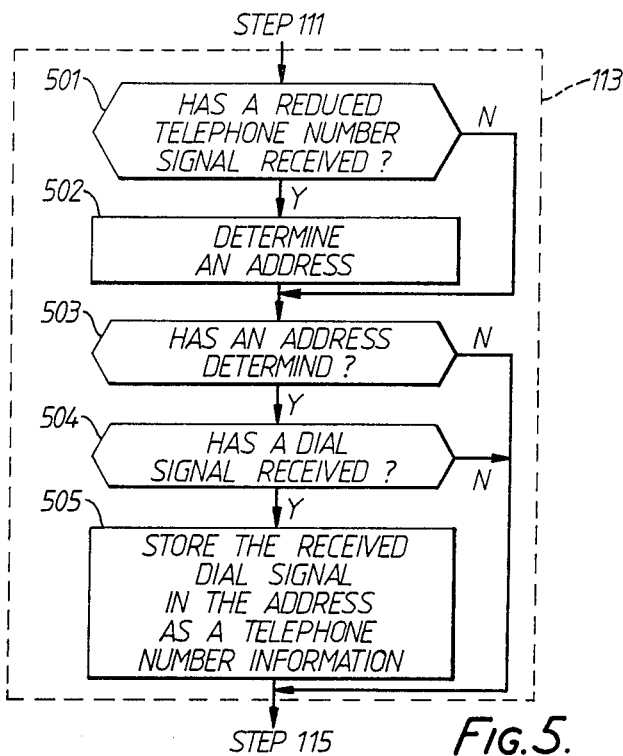

According to this embodiment, if control circuit 12 doesn't receive the end signal for a predetermined period after the last signal is received, control circuit 12 automatically carries out the end of speech operation (not shown in FIG. 4). Also, FIG. 5 shows the operation of step 113 in greater detail.

When the user registers the telephone number information, he first depresses dial keys 32 to input a "reduced" telephone number which is later used to identify the actual telephone number. Next, he depresses dial keys 32 to input a full telephone number. For example, the user depresses '*' key, '1' key and '0' key in sequence to input the reduced telephone number '*, 1, 0,' thereafter he depresses '3' key, '0' key, . . . , '1' key in sequence to input the full telephone number '3, 0, . . . , 1.' Control circuit 12 determines whether the dial signal corresponding to the reduced telephone number is received in response to the received dial signal, step 501. The format of reduced telephone number can be predetermined. It may be, fore example, '*'+'two numerals.' Other formats may also be used as apparent to one of ordinary skill in the art. If control circuit 12 determines that a received dial signal corresponds to the reduced telephone number, it scans at the data table in memory 40 and determines the storage address corresponding to the reduced telephone number, step 502. Thereafter, if control circuit 12 receives the dial signal, steps 503 and 504, it stores the received dial signal in the determined storage address as the full telephone number information, step 505. If control circuit 12 determines the received dial signal corresponds to the reduced telephone number again after storing the dial signal, step 501, it repeats the above-described operation.

Figure 6:
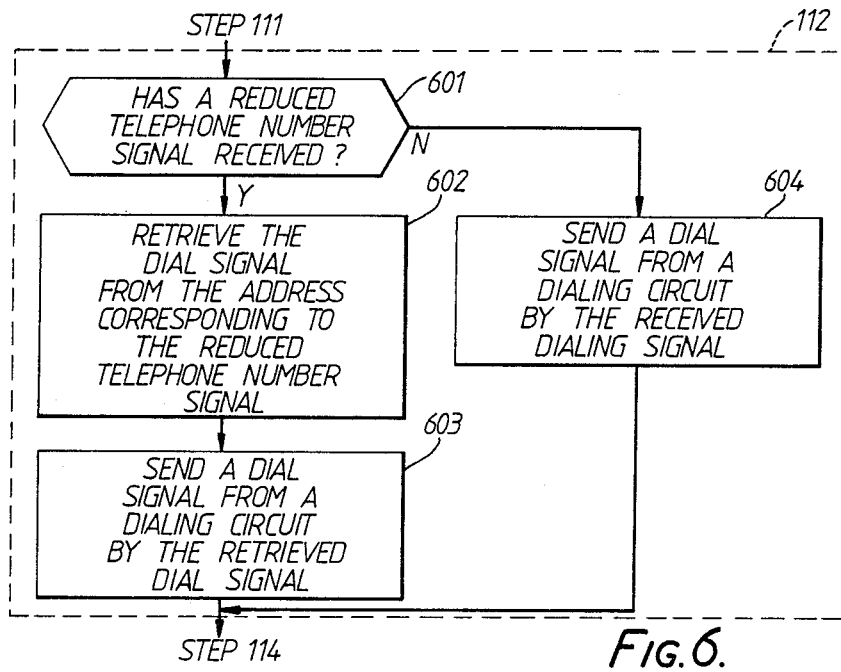

FIG. 6 shows the operation of step 112 of FIG. 4 in greater detail. When the user depresses dial key 32 to input the reduced telephone number instead of the full telephone number, control circuit 12 determines whether the received dial signal corresponds to the reduced telephone number, step 601. If control circuit 12 determines the received dial signal corresponds to the reduced telephone number, step 601, it scans at the data table in memory 40 to determines the storage address corresponding the reduced telephone number and retrieves the stored signal from the determined storage address in memory 40, step 602. Control circuit 12 then sends the dial signal to wired telephone line 3 through line relay 33 in response to the retrieved signal, step 603. If the user depresses dial key 32 to input the full telephone number instead of the reduced telephone number, step 601, control circuit 12 sends the dial signal to wired telephone line 3 in response to the received dial signal, step 604.

Thus, in this embodiment, since line relay 33 is opened while the dial signal from radio telephone set 2 is stored, the radio telephone apparatus is in the waiting sta. Therefore, a call signal can appear from wired telephone line 3 even while the storing operation is carried out. If a call signal arrives from wired telephone line 3, telephone apparatus 50 detects the call signal and generates a ringing signal to notify the user of the incoming telephone call. If the user picks up the handset again after putting down the handset in response to the incoming telephone call, the radio telephone apparatus carries out the response operation for the incoming telephone call after carrying out the end of speech operation.

Figure 7:
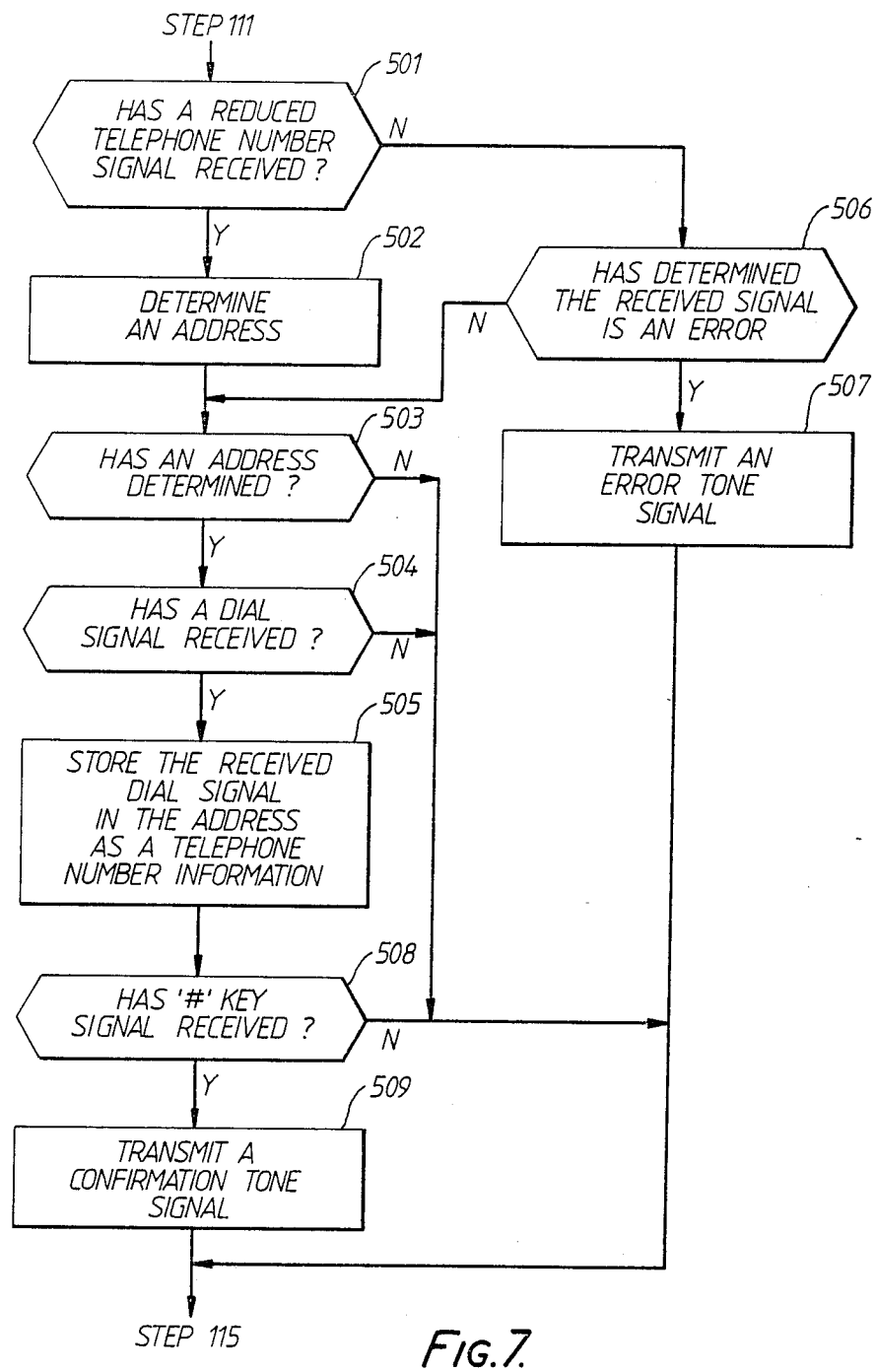
FIG. 7 shows a flow chart of a radio telephone apparatus related to a second embodiment of the present invention.

FIG. 7 shows a flow chart of a second embodiment. The flow chart illustrates the registration of telephone number information, corresponding to FIG. 5. In this flow chart, if control circuit 12 determines the received dial signal is an erroneous reduced telephone number, step 506, it causes transmitter 5 to transmit an error tone signal to radio telephone set 2, step 507. For example, if ten reduced telephone numbers ('*, 0, 1'—'*, 1, 0') are predetermined, control circuit 12 determines the received dial signal is an erroneous reduced telephone number when it receives the dial signal corresponding to '*, 9, 9.' The transmitted error tone signal is received by receiver 14 and generated by speaker 15. Also, if control circuit 12 determines the received dial signal corresponds to the '#' key signal after storing the received dial signal in memory 40, step 508, it sends a confirmation tone signal to transmitter 5 in order to transmit the tone signal to radio telephone set 2, step 509. The confirmation tone signal is received by receiver 14 and generated by speaker 15. The generated tone signal notifies the user that the dial signal is stored in memory 40 as the full telephone number information.

Figure 8:
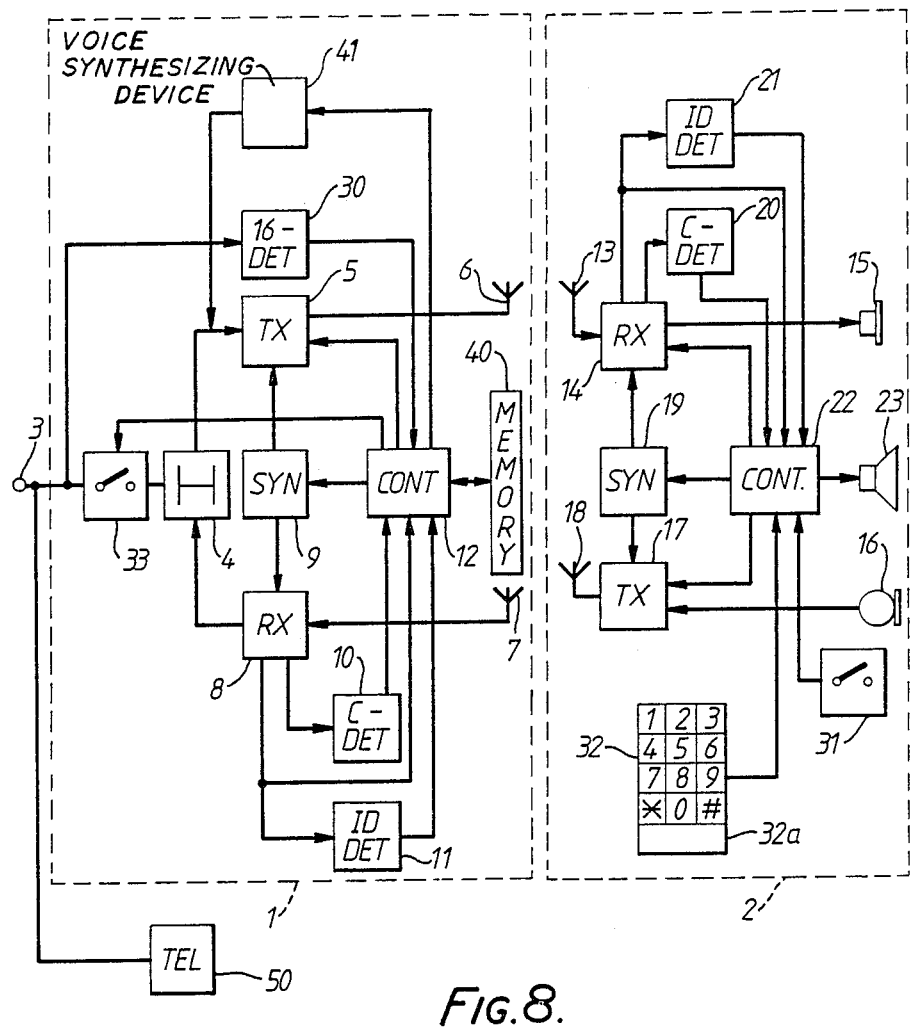
FIG. 8 shows a third embodiment of the present invention in block diagram form.
Figure 9:
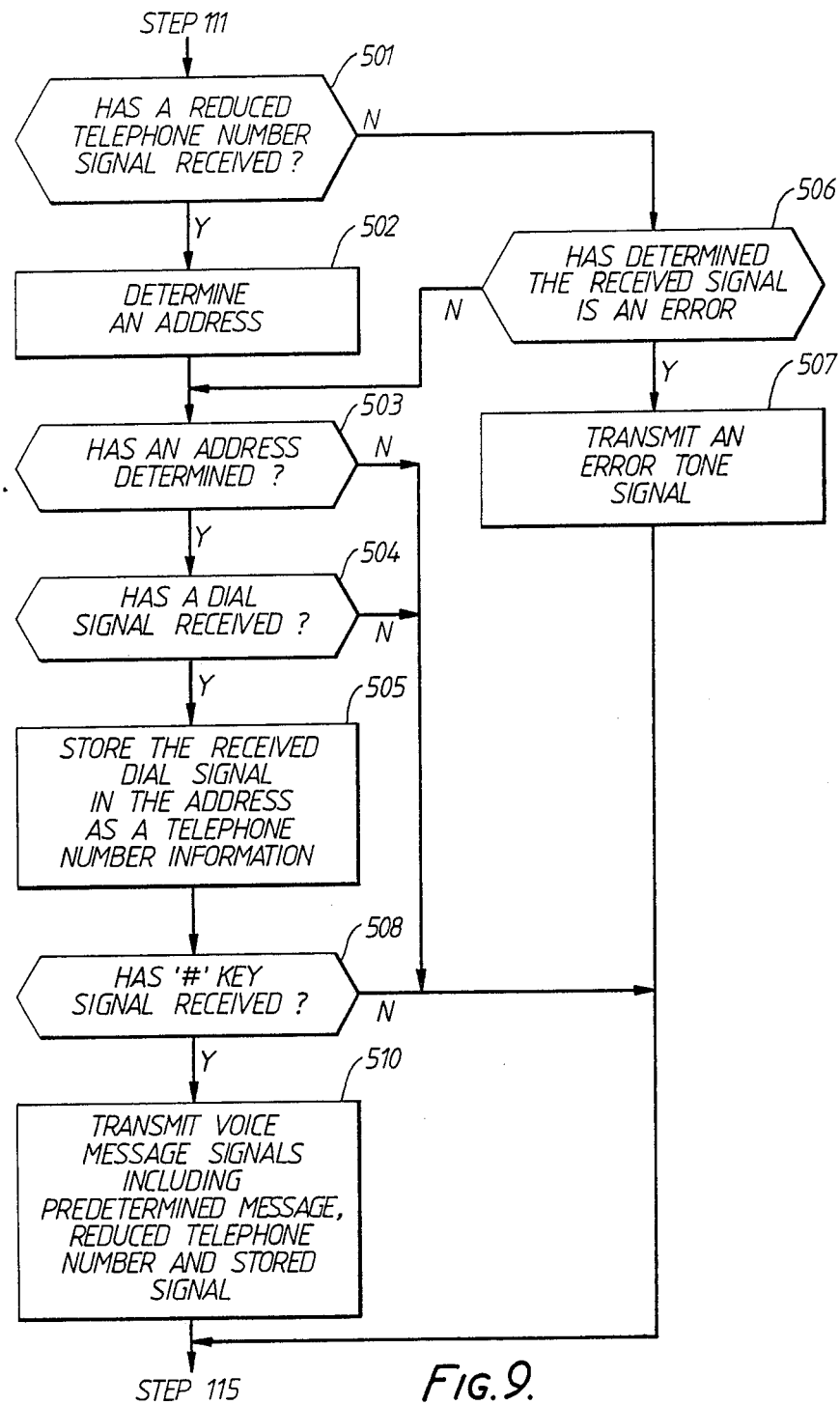
FIG. 9 Shows a flow chart of a radio telephone apparatus of FIG. 8.

FIG. 8 shows a third embodiment. In this embodiment, base unit 1 includes voice synthesizing device 41. Voice synthesizing device 41 generates a voice message signal in response to data from control circuit 12. FIG. 9 shows a flow chart of this embodiment. The flow chart illustrates the registration of telephone number information, corresponding to FIG. 5. The other operations are the same as in the first embodiment.

In this embodiment, if control circuit 12 determines the received dial signal corresponds to the '#' key signal after storing the received dial signal in memory 40, step 508, it retrieves the stored dial signal and the corresponding reduced telephone number data from memory 40 and sends message data to voice synthesizing device 41, step 510. The message data includes predetermined message data, reduced telephone number data and a stored dial signal. Voice synthesizing device 41 generates the voice message signal and sends the signal to transmitter 5 to transmit the signal. The transmitted signal is received by receiver 14 and generated by speaker 15. For example, a voice message, "full telephone number XXXXXXX has been stored. This telephone number corresponds to reduced telephone number XXX," is generated.

Figure 10:
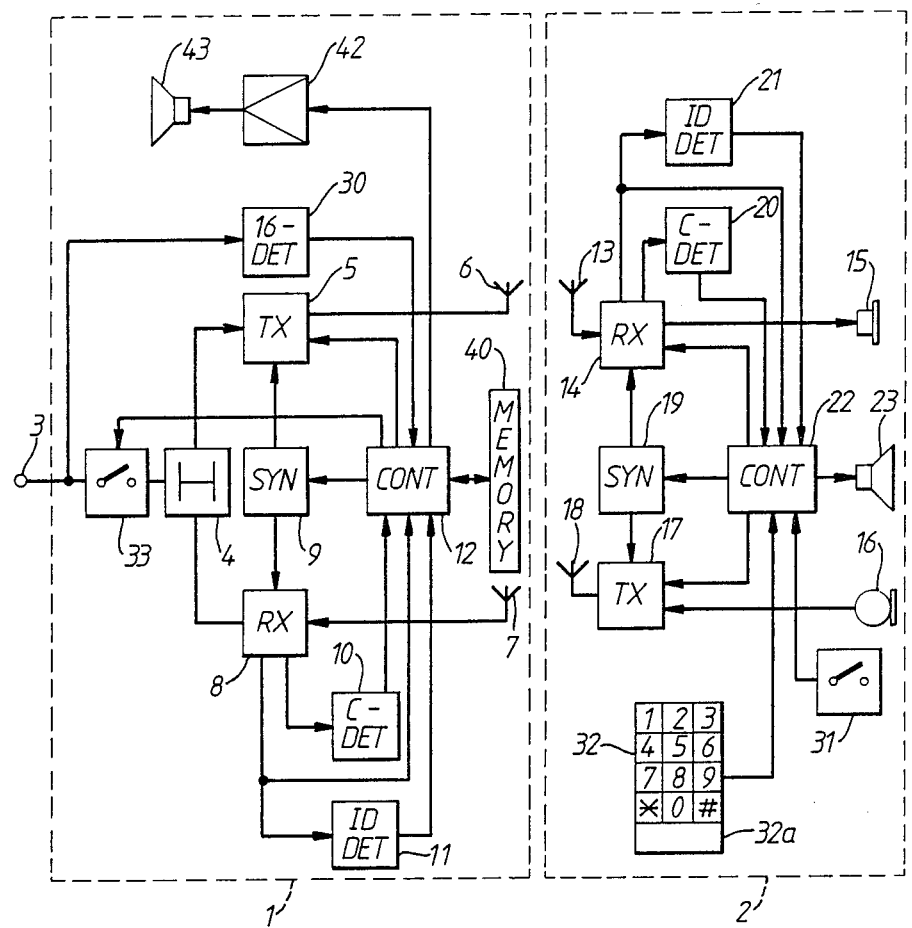
FIG. 10 shows a fourth embodiment of the present invention in block diagram form.

FIG. 10 shows a fourth embodiment. In this embodiment, base unit 1 includes speaker 43 to generate the ringing signal and amplifier 42 to drive speaker 43. If a call signal arrives from wired telephone line 3, while the received dial signal is stored in memory 40, the signal is detected by detector 30. Then, control circuit 12 sends the ringing signal to amplifier 42 in response to the output signal from detector 30. The ringing signal is amplified and generated to notify the user of the incoming telephone call. If the user picks up the handset again after putting down the handset in response to the incoming telephone call, the radio telephone apparatus carries out the response operation for the incoming telephone call after carrying out the end of speech operation.

In the preferred embodiments, the registration signal is transmitted from radio telephone set 2 after a call origination signal is transmitted. However, if a call origination signal is received at first, base unit 1 may transmit the response signal to carry out the registration operation of the dial signal. Also, in the above-described embodiments, a registration signal is transmitted in response to the depression of registration key 32a. However, base unit 1 may determine the request of the registrating operation in response to a particular dial signal from radio telephone set 2.

Further, in the above-described embodiments, the ringing signal is generated by another telephone apparatus 50 and speaker 43 of base unit 1 if the calling signal arrives from wired telephone line 3 while the dial signal is stored as the full telephone number information. However, control circuit 12 may cause transmitter to transmit a particular tone signal to radio telephone set 2, in response to the output signal of detector 30. Therefore, the tone signal is generated by speaker 15 to notify the user of the incoming telephone call.

While the invention has been described herein by reference to several preferred embodiments, various modifications can be made without departing from the true scope and spirit of the invention. It is my intention, therefore, for the appended claims, to embody all such modifications.

I claim:

1. An apparatus provided in a radio telephone apparatus for storing telephone number information to be used for a reduced dialing operation, said radio telephone apparatus having a base unit coupled to a wired telephone line and a radio telephone set and said radio telephone set being connected to said base unit through a radio channel, said apparatus comprising:
   dial means for generating a dial signal in response to a dialing operation;
   registration means for generating a control signal representing a storage request for telephone number information;
   means for disconnecting said wired telephone line from said base unit electrically to break a speech path, in response to the control signal;
   memory means provided in said base unit for storing the dial signal from said dial means as telephone number information in response to the control signal; and
   notification means connected to said wired telephone line for detecting an incoming telephone call from said wired telephone line and generating a ringing signal for notifying the user if an incoming telephone call is detected while said telephone number information is being stored.

2. The apparatus of claim 1 wherein said registration means is provided in said radio telephone set and transmits the control signal to said base unit through the radio channel in response to an operation of a registration key.

3. The apparatus of claim 1 wherein said registration means generates the control signal in response to the dial signal from said dial means by a particular dialing operation.

4. The apparatus of claim 1 wherein said memory means is adapted to store a plurality of dial signais.

5. The apparatus of claim 1 wherein said notification means is another telephone apparatus.

6. The apparatus of claim 1 wherein said notification means is provided in said base unit.

7. The apparatus of claim 1 further comprising;
   confirmation means for generating a confirmation signal for notifying the user if the dial signal is stored in said memory means.

8. The apparatus of claim 7 wherein the confirmation signal comprises a tone signal.

9. The apparatus of claim 7 wherein the confirmation signal comprises a synthesized voice message.

10. The apparatus of claim 9 wherein the synthesized voice message comprises a reduced dial number message and a telephone number message corresponding to the stored dial signal.

11. The apparatus of claim 1 further comprising:
    means for generating a calling origination signal;
    means for connecting said wired telephone line to said base unit electrically to make a speech path, in response to the calling origination signal; and
    means for preventing generating the calling origination signal while the dial signal is stored in said memory means.

12. In a radio telephone apparatus having a base unit coupled to a wired telephone line and a radio telephone set said radio telephone set being connected to said base unit through a radio channel, a method for storing telephone number information to be used for a reduced dialing operation, comprising the steps of:
    (a) generating a dial signal in response to a dialing operation;
    (b) generating a control signal representing a storage request for telephone number information;
    (c) disconnecting said wired telephone line from said base unit electrically to break a speech path, in response to the control signal;
    (d) storing the generated dial signal in a memory of said base unit as a telephone number information, in response to the control signal;
    (e) detecting an incoming telephone call from said wired telephone line; and
    (f) generating a ringing signal for notifying the user if an incoming telephone call is detected while the storing is being carried out.

13. The method of claim 12 further comprising the step of:
    generating a confirmation signal for notifying a user if said dial signal is stored in said memory.

14. The method of claim 13 wherein the confirmation signal comprises a tone signal.

15. The method of claim 13 wherein the confirmation signal comprises a synthesized voice message.

16. The method of claim 15 wherein the synthesized voice message comprises a reduced dial number message and a telephone number message corresponding to the stored dial signal.

17. The method of claim 12 further comprising the steps of:
    generating a calling origination signal;
    connecting said wired telephone line to said base unit electrically to make a speech path, in response to the calling origi-nation signal; and
    preventing generating the calling origination signal while the dial signal is stored in said memory.

* * * * *